United States Patent
Wood et al.

(10) Patent No.: US 8,629,215 B2
(45) Date of Patent: *Jan. 14, 2014

(54) MALODOR ABSORBENT POLYMER AND FIBER

(75) Inventors: Willard E. Wood, Arden Hills, MN (US); Neil J. Beaverson, Vadnais Heights, MN (US)

(73) Assignee: Cellresin Technologies, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,122

(22) Filed: Jul. 11, 2012

(65) Prior Publication Data

US 2012/0301595 A1   Nov. 29, 2012

Related U.S. Application Data

(60) Division of application No. 12/547,865, filed on Aug. 26, 2009, now Pat. No. 8,241,747, which is a continuation-in-part of application No. 12/414,118, filed on Mar. 30, 2009.

(51) Int. Cl.

| | |
|---|---|
| *C08F 8/00* | (2006.01) |
| *C08L 23/00* | (2006.01) |
| *C08L 23/04* | (2006.01) |
| *C08L 23/10* | (2006.01) |
| *A61K 47/48* | (2006.01) |
| *C08G 63/48* | (2006.01) |
| *C08B 37/00* | (2006.01) |

(52) U.S. Cl.
USPC ............... 525/191; 525/240; 525/54.2

(58) Field of Classification Search
USPC ........................ 525/191, 240, 54.2
See application file for complete search history.

(56) References Cited

U.S. PATENT DOCUMENTS

| | | | |
|---|---|---|---|
| 3,340,281 A | 9/1967 | Brannen, Jr. | |
| 4,657,537 A | 4/1987 | Zimmerer | |
| 4,685,909 A | 8/1987 | Berg et al. | |
| 4,919,178 A | 4/1990 | Riga et al. | |
| 6,229,062 B1 | 5/2001 | Mandell et al. | |
| 6,689,932 B2 | 2/2004 | Kruchoski et al. | |
| 6,706,941 B2 | 3/2004 | Hisanaka et al. | |
| 6,756,520 B1 | 6/2004 | Krzysik et al. | |
| 6,825,392 B2 | 11/2004 | Baker | |
| 6,852,904 B2 | 2/2005 | Sun et al. | |
| 7,154,018 B2 | 12/2006 | Koenig et al. | |
| 7,166,671 B2 | 1/2007 | Wood et al. | |
| 7,365,123 B2 | 4/2008 | Wood et al. | |
| 7,470,464 B2 | 12/2008 | Wood et al. | |
| 8,241,747 B2 * | 8/2012 | Wood et al. ............ 428/364 |
| 2001/0039405 A1 | 11/2001 | Keuhn, Jr. et al. | |
| 2001/0039879 A1 | 11/2001 | Chapman | |
| 2002/0058916 A1 | 5/2002 | Hisanaka et al. | |
| 2002/0065496 A1 | 5/2002 | Hisanaka et al. | |
| 2004/0110901 A1 | 6/2004 | Wood et al. | |
| 2006/0276581 A1 | 12/2006 | Ratzsch et al. | |
| 2007/0100304 A1 | 5/2007 | Fell et al. | |
| 2007/0142795 A1 | 6/2007 | Cohen et al. | |
| 2007/0264520 A1 | 11/2007 | Wood et al. | |
| 2010/0247826 A1 | 9/2010 | Wood et al. | |

FOREIGN PATENT DOCUMENTS

| | | |
|---|---|---|
| EP | 1559746 | 8/2005 |
| EP | 1674522 | 6/2006 |
| WO | WO-9730122 | 8/1997 |
| WO | WO0050099 | 8/2000 |
| WO | WO03051414 | 6/2003 |
| WO | WO-2005116136 | 12/2005 |

OTHER PUBLICATIONS

International Search Report and Written Opinion of the International Searching Authority for International Application No. PCT/US2010/029219, dated Jul. 21, 2010 (12 pages).
"Communication pursuant to Article 94(3) EPC," European Examination Report, from the European Patent Office in EP Patent Application No. 10723432.0, mailed Aug. 16, 2012 (pp. 1-4).
"First Chinese Office Action," for Chinese Application No. 2010800145104, corresponding to U.S. Appl. No. 12/547,865, mailed Nov. 20, 2012 (pp. 1-7).
"Response to Communication pursuant to Article 94(3) EPC," dated Aug. 16, 2012, Filed in the European Patent Office on Dec. 13, 2012 for EP Patent Application No. 10723432.0, (pp. 1-2).
"Standard Test Method for Melt Flow Rates of Thermoplastics by Extrusion Plastometer," ASTM International. Designation D 1238-04c. Downloaded Aug. 11, 2009. pp. (1-14 pgs).
"Office Action", from JP Application No. 2012-503618, mailed Jul. 23, 2013, 4 pages.
"Search Report and Written Opinion", from SG Application No. 201106983-8, mailed Jun. 13, 2013, 18 pages.

* cited by examiner

*Primary Examiner* — Nathan M Nutter (74) *Attorney, Agent, or Firm* — Pauly, DeVries Smith & Deffner, L.L.C.

(57) ABSTRACT

Thermoplastic polyolefin polymer composition, polymer chip, fiber, woven or nonwoven fabric, film, closures, laminates can comprise a polymer, a polymer and a nonvolatile polymer-compatible carboxylic acid. Thermoplastic polyolefin polymer composition can also comprise a polymer, a cyclodextrin-modified polymer and a nonvolatile polymer-compatible carboxylic acid. The carboxylic acid moiety of the polymer composition can react with basic materials in the polymer environment and reduce release of the basic material. The cyclodextrin can act to absorb or trap other contaminants or odors in the environment.

11 Claims, 3 Drawing Sheets

MALODOR ABSORBENT POLYMER AND FIBER

CROSS-REFERENCE TO RELATED APPLICATIONS

This application is a divisional application of U.S. application Ser. No. 12/547,865, filed Aug. 26, 2009, which issued as U.S. Pat. No. 8,241,747 on Aug. 14, 2012, which is a continuation-in-part of application Ser. No. 12/414,118, filed Mar. 30, 2009, which application are incorporated herein by reference.

FIELD

The disclosure relates to thermoplastic polymer compositions, typically polyolefin compositions. The polyolefin materials can absorb a wide range of malodors in a variety of applications. The disclosure further relates to polymer material, fiber, woven and nonwoven fabric, film, polymer webs of various thickness, rigid or semi rigid sheets, chips, barrier coatings and other useful polymer forms.

BACKGROUND

Synthetic fibers have found widespread use in a variety of applications. Synthetic fibers have been used to absorb fluids of various types and to neutralize malodors, for example from urine, wound exudate, blood and the like. In some woven and nonwoven applications such as medical, diaper or feminine hygiene, there is a strong need to effectively absorb malodors. Previously, traditional coated synthetic fibers have not been able to satisfactorily absorb malodors at sufficient levels to be of commercial value.

There is a need to have a polymer composition and fiber that can both absorb fluid and neutralize or absorb typical malodorous material including acidic, basic and both polar and non-polar nonionic malodors.

BRIEF DESCRIPTION

The thermoplastic polymer compositions comprise a blend of a polyolefin resin, a modified polyolefin resin and a non-volatile polymer compatible carboxylic acid. In one embodiment the modified polyolefin resin has covalently bonded thereto structures that contain cyclodextrin (CD) moieties that are compatible with the thermoplastic polymer, wherein the cyclodextrin is free of an inclusion complex compound. The modified polyolefin resin can have structures that contain carboxylic acid compounds, dicarboxylic acid, anhydride compounds or an election of such structures that are compatible with the thermoplastic polymer.

Compositions of embodiments of the present invention have improved malodor neutralization properties. Unexpectedly, fibers and other constructs made from compositions of the present disclosure, having a polyolefin, a modified polyolefin and a non-volatile and polymer compatible carboxylic acid, have desired characteristics of neutralizing a large range of differing malodors and permeants. Unexpectedly, fibers and other constructs made from compositions of the present disclosure, having a polyolefin, a modified polyolefin, a covalently bonded cyclodextrin and a non-volatile and polymer compatible carboxylic acid, have desired characteristics of neutralizing a large range of differing malodors and permeants. For example, not intended to be limiting, in a first embodiment, the carboxylic acid moieties of the nonvolatile carboxylic acid can neutralize basic malodor components e.g. ammonia, amines and the like. In a second embodiment, a polyolefin, a modified polyolefin, a covalently bonded cyclodextrin and a non-volatile and polymer compatible carboxylic acid can bind basically reacting malodors and other permeants or inclusion compounds which otherwise would not react, or react too slowly, with the carboxylic acid moieties (e.g., aromatics, alcohols, halides and hydrogen halides, carboxylic acids and their esters, etc.). Thus, the combination of cyclodextrin and a non-volatile and polymer compatible carboxylic acid result in a fiber, or other construct, that is multipurpose with respect to neutralization characteristics. All these characteristics have been achieved without detriment to the processability (for example, extrudability) of the polymer composition.

The term "modified polymer" as used in this specification means that a polymer such as a polyolefin has a either a covalently bonded linking group capable to bond a cyclodextrin to a polymer or a cyclodextrin covalently bonded directly to the polymer or covalently bonded to the polymer through a linking group.

The term "polyolefin compatible" or "polymer compatible" as used herein means that a component, when added to or in contact with a composition containing modified polyolefin or modified polymer as that term is used in this specification, does not phase out of the composition and is not detrimental to the pertinent physical characteristics of the resulting polyolefin, such as tensile strength, melt index, color, odor or other physical characteristics the polyolefin or polymer would otherwise have.

The term "non-volatile" as used herein means a component added to a polyolefin that is not readily vaporized, suffers little loss on evaporation or has a low vapor pressure (e.g. less than 1.5 mm Hg), for example, at polymer processing temperatures in the range of 100-260° C.

The term "neutralize" or "neutralization" as used herein means that a chemical entity is changed, such that an undesirable characteristic (e.g. odor) is reduced, or eliminated. The change may be accomplished by absorption, extreme pH, adsorption, chemisorption, chemical reaction or combinations thereof.

The term "carboxylic acid" as used herein includes at least carboxylic acid, monocarboxylic acid, dicarboxylic acid and anhydrides.

The term "phase stable" refers to materials that are polyolefin compatible and remain in the stable mixture.

BRIEF DESCRIPTION OF THE DRAWINGS

FIG. 3A represents α-cyclodextrin, FIG. 3B represents β-cyclodextrin and FIG. 3C represents γ-cyclodextrin. Such cyclodextrins have hydroxyl groups formed on the perimeter of the molecule that can be available for reaction with, for example, anhydride groups or epoxide groups or both on functionalized polyolefins.

DETAILED DESCRIPTION OF THE ILLUSTRATIVE EMBODIMENTS

Compositions, fibers and films prepared from compositions containing a modified polyolefin and a polyolefin with a non-volatile and polymer compatible carboxylic acid have unexpectedly been found to effectively neutralize malodors which arise from basic components, for example, but not limited to ammonia and amines. In these systems the polymer compatible carboxylic acid can be melt-blended into the polyolefin and modified polyolefin blend and is compatible with the polyolefin and modified polyolefin blend.

Compositions, fibers and films prepared from compositions containing a modified polyolefin with a covalently bonded cyclodextrin and a polyolefin with a non-volatile and polymer compatible carboxylic acid have unexpectedly been found to effectively neutralize malodors which arise from basic components, for example, but not limited to ammonia and amines and nonionic polar and nonpolar malodors. In these systems the polymer compatible carboxylic acid can be melt-blended into the polyolefin and modified polyolefin blend and is compatible with the polyolefin and modified polyolefin blend.

In one embodiment, the thermoplastic polymer compositions of the invention comprise a blend of a polyolefin resin, a modified polyolefin resin and a non-volatile polymer compatible carboxylic acid. In a second embodiment, the modified polyolefin resin contains from about 0.1 to about 10 wt % or 1 to 9 wt % cyclodextrin. The thermoplastic polymer compositions comprise a blend of a major proportion of a polyolefin resin and between about 1 wt % to about 50 wt %, or between about 1 wt % to about 47 wt % of a modified polyolefin resin based on the polymer composition; and from about 0.1 wt % to about 15 wt %, about 0.1 to 5 wt %, 0.2 wt % to about 3 wt % or 0.5 to 1.5 wt % a non-volatile and polymer compatible carboxylic acid based on the polymer composition.

A cyclodextrin-modified polyolefin resin can be prepared by covalently grafting a cyclodextrin moiety onto a polyolefin or polyolefin blend to be used in combination with a non-volatile and polymer compatible carboxylic acid. The grafting can be achieved by reacting a functional group, such as a hydroxyl group, of cyclodextrin (CD) with a functional group, such as an epoxy, acid, acid chloride or anhydride moiety, on the polyolefin or polyolefin blend to form a bond between the cyclodextrin and the polyolefin. In another embodiment, an anhydride or epoxide component of the functionalized polyolefin can be used to form a reaction product. For example, a primary hydroxyl on the cyclodextrin reacts with a maleic anhydride moiety under conditions that convert substantially all anhydride groups to a half-ester. It has quite unexpectedly been found that by such conversion it is possible to significantly change low molecular weight transport of organic compounds in conventional polyolefin polymers using parent cyclodextrins.

Embodiments according to the present disclosure include a process for a functionalized polyolefin and a polyolefin in a customary compounding apparatus forming a compatible polyolefin composition that is combined with a non-volatile and polymer compatible carboxylic acid component. $C_9$-$C_{24}$ acids and polyacids are not typically compatible with PE or PP without a modified polymer. The modified olefin compatiblizes the non-volatile carboxylic acid component, inhibiting the migration of the carboxylic acid component to the surface of the article. This differentiates this application from that of fatty acids and soaps that are used as mold release agents and lubricants where they are intended to bleed to the surface because of their incompatibility.

Additionally, the vapor pressure characteristics of the non-volatile and polymer compatible carboxylic acid can be tailored to the temperature profiles of the melt grafting process thus avoiding or minimizing the presence of unsafe volatile components in the processing area.

The modified polyolefins and the Cyclodextrin grafted polymer compositions, according to the present disclosure, are useful in extruded or molded structures such as thin films, laminates, semi-rigid films and rigid containers as well as fibers. For instance, these structures provide functional properties for a sealant layer in flexible food packaging, a beverage contact layer for cartons and bottles, plastic closures and sealing element layers for bottle and jars for sauces, soups, puddings, baby food and wine, a non-contact layer in plastic fuel tanks, and polymers used to manufacture fiber, textile, and nonwoven compositions for disposable diapers.

Briefly, the disclosure comprises a polyolefin covalently bonded to a CD blended with a non-volatile and polymer compatible carboxylic acid. The CD can be reacted with a functionalized polyolefin. Polyolefin can be modified with a variety of known reactive functional groups can be used to covalently bind CD. One version is modification or functionalization of polyolefins where a peroxide initiator is used with various unsaturated polar monomers to add chemically reactive moieties on the polymer has important unexpected application when used in combination with a group of compounds in this present disclosure known as cyclodextrins and carboxylic acids.

In other embodiments, this disclosure relates to a polyolefin comprising a polymer, a cyclodextrin-functionalized polyolefin and a non-volatile and polymer compatible carboxylic acid which act to neutralize malodors.

The disclosure further relates to a thermoplastic masterbatch comprising a blend of a polyolefin and an anhydride-modified polyolefin resin and a non-volatile and polymer compatible carboxylic acid.

Embodiments in accordance with the present disclosure also include a chip with a major dimension of less than about 10 mm. and a weight of about 20 to 50 mg, whereby the chip comprises compositions of the present disclosure as described above. Further embodiments include a container comprising an enclosed volume surrounded by a polyolefin web, the web comprised of compositions as described above, such containers being useful, for example, in the packaging of food. Additionally, fibers and films prepared from the compositions of the present disclosure are also included in accordance with the present disclosure.

Useful carboxylic acids for use in the compositions for malodor reduction include nonvolatile polymer compatible materials. The materials are used in the combined compositions and are not bonded to the polyolefin. Such materials are high-molecular weight hydrocarbyl-substituted carboxylic acids or anhydrides. These high-molecular weight carboxylic acids are compatible with the composition containing the polymer and modified polymer and are non-volatile and can act to absorb, adsorb or neutralize malodors. Low molecular weight carboxylic acids such as acetic acid, propionic acid and butyric acid have limited utility (i.e., vapor pressure and odor) compared with the high molecular weight carboxylic acids in disclosed herein. Typically these useful high molecular weight carboxylic acids or anhydrides or derivatives have hydrocarbyl groups or substituents containing an average of about 8 to about 500 carbon atoms, about 8 to about 200 carbon atoms, about 9 to about 300 carbon atoms, about 10 to about 50 carbon atoms and in some cases about 8 to about 40 carbon atoms.

The hydrocarbyl substituent can be derived from at least one moiety derived from the group of polymers such as ethylene, propylene, 1-butene, isobutene, 1-pentene, 2-methyl-1-butene, 3-methyl-1-butene, 1-hexene, 1-heptene, 1-octene, styrene, 1-nonene, 1-decene, 1-undecene, 1-dodecene, 1-tridecene, 1-tetradecene, 1-pentadecene, 1-hexadecene, 1-heptadecene and 1-octadecene. The hydrocarbyl substituent can be derived from an alpha-olefin fractions such as those selected from the group consisting of $C_{15-25}$ alpha-olefins. Useful carboxylic acids can be mono-or polycarboxylic acids or anhydrides. The acid components can be aliphatic or aromatic. These components can contain polar substituents provided that the polar substituents are not present in portions sufficiently large to alter significantly the hydrocarbon character of the acid. Typical suitable polar substituents include halo, such as chloro and bromo, oxo, oxy, formyl, sulfenyl, sulfinyl, thio, nitro, etc. Such polar substituents, if present, preferably do not exceed about 10% by weight of the total weight of the hydrocarbon portion of these components, exclusive of the carboxyl groups.

The monocarboxylic acids include aliphatic acids, isoaliphatic acids, i.e., acids having one or more lower acyclic pendant alkyl groups. Such acids often contain a principle chain having at least about 14 saturated, aliphatic carbon atoms. The chain can have 14 to 35 carbon atoms and at least one but usually no more than about four pendant acyclic alkyl groups. The principle chain of the acid is exemplified by groups derived from tetradecane, pentadecane, hexadecane, heptadecane, octadecane, and eicosane. The pendant group can be a lower alkyl group such as methyl, ethyl, n-propyl, isopropyl, n-butyl, isobutyl, tert-butyl, n-hexyl, or other groups having up to about 7 carbon atoms. The pendant group can also be a polar-substituted alkyl group such as chloromethyl, bromobutyl, methoxyethyl, or the like, containing no more than one polar substituent per group. Specific examples of such isoaliphatic acids include 10-methyl-tetradecanoic acid, 11-methyl-pentadecanoic acid, 3-ethyl-hexadecanoic acid, 15-methyl-heptadecanoic acid, 16-methyl-heptadecanoic acid, 6-methyl-octadecanoic acid, 8-methyl-octadecanoic acid, 10-methyl-octadecanoic acid, 14-methyl-octadecanoic acid, 16-methyloctadecanoic acid, 15-ethylheptadecanoic acid, 3-chloromethyl-nonadecanoic acid, 7,8,9,10-tetramethyl-octadecanoic acid, and 2,9,10-trimethyl-octadecanoic acid.

The isoaliphatic acids include mixtures of branch-chain acids prepared by the isomerization of commercial fatty acids of, for example, about 16 to about 20 carbon atoms. A useful method involves heating the fatty acid at a temperature above about 250° C. and a pressure between about 200 and 700 psi, distilling the crude isomerized acid, and hydrogenating the distillate to produce a substantially saturated isomerized acid. The isomerization can be promoted by a catalyst such as mineral clay, diatomaceous earth, aluminum chloride, zinc chloride, ferric chloride, or some other Friedel-Crafts catalyst. The concentration of the catalyst may be as low as about 0.01%, but more often from about 0.1% to about 3% by weight of the isomerization mixture. Water also promotes the isomerization and a small amount, from about 0.1% to about 5% by weight, of water may thus be advantageously added to the isomerization mixture. The unsaturated fatty acids from which the isoaliphatic acids may be derived include oleic acid, linoleic acid, linolenic acid, and commercial fatty acid mixtures such as tall oil acids.

As disclosed in the foregoing patents, there are several processes for preparing these high-molecular weight acids and anhydrides. Generally, these processes involve the reaction of (1) an ethylenically unsaturated carboxylic acid, acid halide, anhydride or ester reactant with (2) an ethylenically unsaturated hydrocarbon or a chlorinated hydrocarbon at a temperature within the range of about 100°-300. degree. C. The chlorinated hydrocarbon or ethylenically unsaturated hydrocarbon reactant can contain at least about 10 carbon atoms. In some embodiments the chlorinated hydrocarbon or ethylenically unsaturated hydrocarbon reactant can contain at least about 20 carbon atoms or more, at least about 30 carbon atoms or more, at least about 40 carbon atoms or more, or even at least about 50 carbon atoms. Additionally, the chlorinated hydrocarbon or ethylenically unsaturated hydrocarbon reactant can contain polar substituents, oil-solubilizing pendant groups, and can be unsaturated within the general limitations explained hereinabove.

When preparing the hydrocarbyl-substituted carboxylic acids, the carboxylic acid reactant usually corresponds to the formula $R°—(COOH)_n$, wherein $R°$ is characterized by the presence of at least one ethylenically unsaturated carbon-to-carbon covalent bond and n is an integer from 1 to about 6 and preferably 1 or 2. The acidic reactant can also be the corresponding carboxylic acid halide, anhydride, ester, or other equivalent acylating agent and mixtures of one or more of these. Ordinarily, the total number of carbon atoms in the acidic reactant will not exceed about 20, preferably this number will not exceed about 10 and generally will not exceed about 6. Preferably the acidic reactant will have at least one ethylenic linkage in an alpha-, beta-position with respect to at least one carboxyl function. Exemplary acidic reactants are acrylic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, and the like. Preferred acid reactants include acrylic acid, methacrylic acid, maleic acid, and maleic anhydride.

The ethylenically unsaturated hydrocarbon reactant and the chlorinated hydrocarbon reactant used in the preparation of these high-molecular weight carboxylic acids and anhydrides can be high molecular weight, substantially saturated petroleum fractions and substantially saturated olefin polymers and the corresponding chlorinated products. Polymers and chlorinated polymers derived from mono-olefins having from 2 to about 30 carbon atoms, preferably 2 to about 20 carbon atoms, more preferably 2 to about 12 carbon atoms, more preferably 2 to about 8 carbon atoms, more preferably 2 to about 6 carbon atoms are useful. Useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, 4-octene, 2-dodecene, etc.

Interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

For reasons of hydrocarbon/polyolefin compatibility, the interpolymers contemplated for use in preparing the high-molecular weight carboxylic acids and anhydrides useful in accordance with the present disclosure can be substantially aliphatic and substantially saturated. That is, they should contain at least about 80% and preferably at least about 95%, on a weight basis, of units derived from aliphatic monoolefins. Preferably, they contain no more than about 5% olefinic bonds based on the total number of the carbon-to-carbon covalent bonds present.

In one embodiment of the present disclosure, the polymers and chlorinated polymers are obtained by the polymerization of a $C_4$ refinery stream having a butene content of about 35% to about 75% by weight and an isobutene content of about 30% to about 60% by weight in the presence of a Lewis acid catalyst such as aluminum chloride, chlorinated alumina or boron trifluoride. These polyisobutenes can contain predominantly isobutene repeat units of the configuration.

The chlorinated hydrocarbons and ethylenically unsaturated hydrocarbons used in the preparation of the high-molecular weight carboxylic acids and anhydrides can have up to about 500 carbon atoms per molecule. Preferred high-molecular weight carboxylic acids and anhydrides are those containing hydrocarbyl groups of about 8 to 500 carbon atoms, about 9 to 300 carbon atoms and yet other embodiments about 10 to about 50 carbon atoms. The high-molecular weight carboxylic acids and anhydrides may also be prepared by halogenating a high molecular weight hydrocarbon such as the above-described olefin polymers to produce a polyhalogenated product, converting the polyhalogenated product to a polynitrile, and then hydrolyzing the polynitrile. They may be prepared by oxidation of a high molecular weight polyhydric alcohol with potassium permanganate, nitric acid, or a similar oxidizing agent. Another method involves the reaction of an olefin or a polar-substituted hydrocarbon such as a chloropolyisobutene with an unsaturated polycarboxylic acid such as 2-pentene-1,3,5-tricarboxylic acid prepared by dehydration of citric acid.

The high-molecular weight carboxylic acid and anhydrides can also be obtained by reacting chlorinated carboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in U.S. Pat. No. 3,340,281, this patent being incorporated herein by reference.

The low-and high-molecular weight carboxylic acid anhydrides can be obtained by dehydrating the corresponding diacids. Dehydration is readily accomplished by heating the acid to a temperature above about 70° C., preferably in the presence of a dehydration agent, e.g., acetic anhydride. Cyclic anhydrides are usually obtained from polycarboxylic acids having acid groups separated by no more than three carbon atoms such as substituted succinic or glutaric acid, whereas linear anhydrides are usually obtained from polycarboxylic acids having the acid groups separated by four or more carbon atoms.

The low-molecular weight and high-molecular weight carboxylic acids used herein include acid-producing derivatives thereof (in addition to the anhydrides) such as acyl halides and the like. Thus, the term "carboxylic acid" when used in the claims herein also refers to the acyl halides of such acids. These acyl halides can be prepared by the reaction of the carboxylic acids or their anhydrides with a halogenating agent such as phosphorus tribromide, phosphorus pentachloride or thionyl chloride using known techniques.

The addition of maleic anhydride to a normal alpha olefin generates an alkenyl succinic anhydride. The "ene" reaction is an indirect substituting addition. It involves the reaction of an olefin with an allylic hydrogen (ene) with an enophile, e.g., maleic anhydride. The reaction results in a new bond forming between two unsaturated carbons and the allylic hydrogen transfers to the maleic anhydride through a cyclic transition state. The reaction can be carried out using a range of normal alpha olefins from 1-butene to $C_{30+}$ normal alpha olefin wax. The maleic anhydride molecule supplies the reactive anhydride functionality to the alkenyl succinic anhydride, while the long chain alkyl portion provides the hydrophobic properties.

Alkenyl succinic anhydride materials are available commercially such as maleic anhydride derivatives comprises products with an alkenyl backbone that starts at $C_8$ and progresses through to $C_{18}$. By changing the nature of the starting alkene (i.e. straight chain vs. isomerised form) the physico-chemical properties of the resultant alkenyl succinic anhydride (e.g. solid vs. liquid form at room temperature) can be modified. Commercially available useful materials include: dodecenylsuccinic anhydride, n-tetradecenyl succinic anhydride, hexadecenylsuccinic anhydride, i-hexadecenyl succinic anhydride octadecenylsuccinic anhydride, and tetrapropenyl succinic anhydride. The polymethylene chains are shown in a specific conformation for convenience purposes and do not conform to these structures in the composition of the invention. Hydrocarbyl-substituted succinic acids and anhydrides are preferred high-molecular weight carboxylic acids and anhydrides. These acids and anhydrides can be prepared by reacting maleic anhydride with an olefin or a chlorinated hydrocarbon such as a chlorinated polyolefin. The reaction involves merely heating the two reactants at a temperature in the range of about 100° C. to about 300° C., preferably, about 100 to 200° C.

The product from this reaction is a hydrocarbyl-substituted succinic anhydride wherein the substituent is derived from the olefin or chlorinated hydrocarbon. The product may be hydrogenated to remove all or a portion of any ethylenically unsaturated covalent linkages by standard hydrogenation procedures, if desired. The hydrocarbyl-substituted succinic anhydrides may be hydrolyzed by treatment with water or steam to the corresponding acid. The high-molecular weight hydrocarbyl-substituted succinic acids and anhydrides can be represented by the formula:

wherein R is the hydrocarbyl substituent. Preferably R contains from about 10 to about 500 carbon atoms, more preferably from about 15 to about 500 carbon atoms, or from about 18 to about 500 carbon atoms.

Cyclodextrin (CD) is a cyclic oligomer of α-D-glucopyranoside units formed by the action of certain enzymes such as cyclodextrin glycotransferase (CGTase). Three cyclodextrins (alpha, beta, and gamma) are commercially available consisting of six, seven and eight α-1,4-linked glucose monomers, respectively (See FIGS. 1A, 1B and 1C). The most stable three-dimensional molecular configuration for these oligosaccharides is a toroid with the smaller and larger opening of the toroid presenting primary and secondary hydroxyl groups. The specific coupling of the glucose monomers gives the CD a rigid, truncated conical molecular structure with a hollow interior of a specific volume. This internal cavity, which is lipophilic (i.e., is attractive to hydrocarbon materials when compared to the exterior), is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

CYCLODEXTRIN TYPICAL PROPERTIES

| CD PROPERTIES | α-CD | β-CD | γ-CD |
| --- | --- | --- | --- |
| Degree of polymerization (n =) | 6 | 7 | 8 |
| Molecular Size (A°) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[\alpha]^{25}_D$ | +150.5 | +162.5 | +177.4 |
| Color of iodine complex | Blue | Yellow | Yellowish Brown |
| Solubility in Distilled water (g/100 mL) 25° C. | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The parent cyclodextrin molecule, and useful derivatives, can be represented by the following formula (the ring carbons show conventional numbering) in which the vacant bonds represent the balance of the cyclic molecule:

The CD's internal cavity size (i.e., α, β, γ) can be considered and the functional group modification can be suitable for changing the desired bulk polymer and surface polymer characteristics in addition to forming an inclusion complex with targeted volatiles or impurities. To achieve a specific result, more than one cavity size and functional group may be necessary.

According to the present disclosure, the cyclodextrin (CD) is a compound substantially free of an inclusion complex. As applied in this disclosure, the term "substantially free of an inclusion complex" means that the quantity of the CD in the bulk polymer contains a large fraction having CD free of a polymer contaminant in the central pore of the cyclodextrin ring (see FIGS. 1A, 1B and 1C). The central pore is used as a binding location for permeants. Upon use, the central pore can acquire a permeant or other inclusion compound. However, some complexing can occur before use, for example, during manufacture. This complexing can occur as residual polymer impurities and degradation materials become available for inclusion into the CD cavity for complexation.

CD molecules have available for reaction with a functionalized polyolefin the primary hydroxyl at the six position of the glucose moiety, and at the secondary hydroxyl in the two and three positions. Because of the geometry of the CD molecule, and the chemistry of the ring substituents, all hydroxyl groups are not equal in reactivity. However, with care and effective reaction conditions, dry CD molecules can be reacted to obtain grafted CD. CD with selected substituents (i.e. substituted only on the primary hydroxyl or selectively substituted only at one or both the secondary hydroxyl groups) can also be grafted if desired. Directed synthesis of a derivatized molecule with two different substituents or three different substituents is also possible. These substituents can be placed at random or directed to a specific hydroxyl. Further, CD alcohol derivatives (e.g., hydroxyethyl and hydroxypropyl) and amino derivatives can be reacted to make a grafted CD.

The preferred preparatory scheme for producing a grafted CD polyolefin material having compatibility with polyolefin resin involves reactions at the primary or secondary hydroxyls of the CD molecule. It is meant that a hydroxyl functionality of the CD reacts with the anhydride or epoxide component of the functionalized polyolefin to form a reaction product. The formation of an ester or ether bond on either the primary or secondary ring hydroxyls of the CD molecule involve well-known reactions. Further, CD having less than all of available hydroxyls substituted with derivative groups can be grafted with one or more of the balance of the available hydroxyls. The primary —OH groups of the cyclodextrin molecules are more readily reacted than the secondary groups. However, the molecule can be substituted on virtually any position to form useful compositions. Broadly, we have found that a wide range of pendant substituent moieties can be used on the molecule. These derivatized cyclodextrin molecules can include alkylated cyclodextrin, hydrocarbyl-amino cyclodextrin, and others. The substituent moiety must include a region that provides compatibility to the derivatized material.

Amino and azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Such derivatives can be manufactured in symmetrical substituted amine groups (those derivatives with two or more amino or azido groups symmetrically disposed on the cyclodextrin molecule or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen-containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino and piperizino.

The cyclodextrin molecule can be substituted with heterocyclic nuclei including pendent imidazole groups, histidine, imidazole groups, pyridino and substituted pyridino groups.

Thermoplastic Resins

Polyolefins such as polyethylene and polypropylene can be use in the invention as well as copolymers of ethylene propylene and other alpha olefin monomers.

Commercial polyolefin functionalization is achieved using solution, melt and solid state routes known in the art. The process covalently bonds monomers onto vinyl polymers or onto polyolefin polymers including copolymers of olefins with other monomers, such as vinyl monomers, which predominately constituent the olefin portion. Polyolefins useful in modified or un-modified embodiments according to the disclosure include poly(ethylene) or PE, poly(propylene) or PP, poly(ethylene-co-propylene) or PEP, ethylene/methyl acrylate copolymer, and ethylene/ethyl acrylate copolymer. The polyolefins can be functionally modified with unsaturated compounds such as unsaturated anhydrides and carboxylic acids. Any packaging grade of a vinyl polymer can be used.

Melt flow index or melt flow rate of a thermoplastic material, including both a polyethylene and a polypropylene can be measured in accord with ASTM method D1238. This test method obtains a measurement of the rate of extrusion of molten resins at a defined temperature and through a standard die under specific weight conditions using a piston driven plastometer device as defined in the method. Each class thermoplastic polymer (e.g.) polyethylene, polypropylene, polyacrylic, polyester, polyvinyl chloride etc., has a established and defined set of temperature and weight parameters. The melt flow rate or melt index have been used for many years to approximate molecular weight. Molecular weight varies inversely to melt flow index or melt flow rate. As the melt flow rate increases, the molecular weight is known to decrease. For polyethylene the standard conditions are 190° C. and 2.16 kG. For polypropylene the standard conditions are 230° C. and 2.16 kG.

Polyolefin and functionalized polyolefins have extensive industrial applications such as coextrusion tie resins in multilayer films and bottles for the food industry, compatibilizers for engineering polymers and plastic fuel tank tie resins for the automotive industry, flexibilization and compatibilization of halogen free polymers for cables and for filler materials used in roofing construction. Functionalized polyolefins can also find application in containers for food contact. Functionalized polyolefins useful in the present disclosure are maleated polyethylene and polypropylene (OREVAC™ and LOTRYL™ available from Arkema, Philadelphia, Pa., PLEXAR® resins available from EQUISTAR, Rotterdam, The Netherlands, ADMER® resin from Mitsui Chemicals, Tokyo, Japan, FUSABOND® resins from DuPont, Wilmington, Del., OPTIM™ resins from MÅNAS, India and EXXELOR™ from Exxon/Mobil, Houston, Tex.), functionalized EP, EVA and EPDM (such as ethylene-propylene-butadiene or, ethylene-propylene-1,4-hexadiene polymers) ethylene-octene copolymers, ethylene-n butyl acrylate-maleic anhydride, ethylene-ethylacrylate-maleic anhydride terpolymers and copolymers of ethylene-glycidyl methacrylate and the like. The ethylene-propylene-1,4-hexadiene copolymer can be represented as:

wherein x is selected to obtain about 70 to 90 wt % ethylene, y is selected to obtain about 10 to 30 wt % propylene and z is selected to obtain up to about 5 wt % 1,4-hexadiene. The vacant bonds are linked to similar groups, H, or end groups.

Other polyolefins can be used in compositions of the present which are known in the art to impart desirable processing or end product characteristics. For example, polybutene can be added to increase fiber strength. Other olefins that can be added to produce copolymers or blends include alpha olefins such as 1-hexene and 1-octene to impart flexibility.

Compositions in accordance with the present disclosure can be prepared using reactive extrusion by feeding a dry cyclodextrin, or derivative thereof, (<0.10% moisture), a functionalized polyolefin and optionally a second polyolefin, into an extruder at temperatures such that the cyclodextrin reacts with the functionalized polyolefin as the molten polymer and cyclodextrin are transported through the extruder to form a reaction product containing, for example, an ester group which covalently bonds the cyclodextrin to the polyolefin. The ratio of functionalized polyolefin to non-functionalized polyolefin can be adjusted for a specific application and conversion process.

The present invention is directed to a stoichiometric reaction product of a cyclodextrin and a graft linking agent (i.e., anhydride, epoxide, etc.), and a non-volatile and polymer compatible carboxylic acid, resulting in a modified polymer especially suited as a masterbatch which can be subsequently let down with one or more non-functionalized thermoplastic polymers and thermoplastic elastomers at a weight ratio of one (1) parts of the masterbatch composition to ten (10) to twenty (20) parts of non-functionalized polymer. In other words the blend of polymer and master batch, or functionalized polymer, after blending can contain about 0.01 to 10 wt % of the CD functionalized polymer, in certain applications the polymer can contain about 0.02 to 8 wt % of the functionalized material, about 0.02 to 5 wt % of the functionalized material or about 0.02 to 2 wt % of the functionalized material. A maleic acid, fumaric acid or maleic anhydride functionalized material is useful for bonding CD to the polyolefin. The stoichiometric ratio for melt grafting is calculated on a gram-mole (gram-formula-weight) basis where one (1) gram-mole of CD (α, β or γ form) is equivalent to one (1) gram-mole the grafted anhydride, glycidyl and carboxylic acid moiety.

EXAMPLES

Spunbond Fiber Production

Spunbond webs were produced with fatty acids and fatty acid derivatives for analyzing processability and neutralization of ammonia and volatile amine compounds. A Nordson Fiber Systems/Hill Inc. Bicomponent spunbond System was used with a die orifice diameter of 0.35 mm and a capillary ratio of 4:1. The quenching distance was 41 cm, with a spinning distance of 60 cm, and forming distance of 75 cm. This configuration produced two denier fiber (18 u); 20 gms per square meter web.

The Bicomponent Spunbond line was configured to extrude different melt streams into the Core and Sheath. Only in the case of Example 6 is the core and sheath formulation different. All formulation with the exception of Comparative Example C1 were made by adding a concentrate (masterbatch) containing the fatty acid, polybutene, MA/PP and homopolymer PP at a ratio of 15 parts concentrate to 85 parts PP homopolymer Example 1

Spunbond Fiber; 93.25% PP Homopolymer, 2.1% Polybutene, 3.9% MA/PP 0.75% Oleic Acid. Some smoking.

Example 2

Spunbond Fiber; 93.25% PP Homopolymer, 2.1% Polybutene, 3.9% MA/PP 0.75% Stearic Acid. Some smoking.

Example 3

Spunbond Fiber; 93.25% PP Homopolymer, 2.1% Polybutene, 3.9% MA/PP (high MA content), 0.75% Octadecenyl Succinic Anhydride. Low smoking.

Example 4

Spunbond Fiber; 93.25% PP Homopolymer, 2.1% Polybutene, 3.9% MA/PP (high MA content), 0.75% Sebacic Acid. Heavy smoking.

Example 5

Spunbond Fiber; 93.25% PP Homopolymer, 2.1% Polybutene, 0.0% MA/PP, 0.75% Stearic Acid. Heavy smoking.

Example 6

Spunbond Fiber; 93.25% PP Homopolymer, 2.1% Polybutene, 3.9% MA/PP (high MA content) Sheath: 0.75% Octadecenyl Succinic Anhydride; Core: 0.75% Sebacic Acid. Low smoking.

Example 7

Spunbond Fiber; 91.75% PP Homopolymer, 2.1% Polybutene, 3.9% MA/PP (high MA content), 1.5% Alpha CD, 0.75% Octadecenyl Succinic Anhydride.

Comparative Example C1

Spunbond Fiber 100% PP Homopolymer. No smoking.

Comparative Example C2

Spunbond Fiber; 88.45% PP Homopolymer, 10.05% MA/PP (low MA content), 1.5% Alpha CD, Comparative Example C3

Spunbond Fiber, 92.5% PP Homopolymer, 2.1% Polybutene, 3.9% MA/PP (high MA content), 1.5% Alpha CD, When fatty acids are incorporated into Polypropylene and extruded into fiber some of the fatty acid volatilizes at 240° F. (the temperature of the molten PP when it exits the die) the fatty acids quickly condense as the temperature of the air decreases as it is pulled away by the exhaust.

Headspace Ammonia Analysis

Samples were prepared by placing about 0.670 g fiber swatches into 250 mL jars (I-Chem item #S121-0250, tall clear WM Septa-Jar™, Fisher-Scientific P/N 05-719-452) equipped with "TEFLON™" faced septa (available from Fisher Scientific P/N 14-965-84). Empty calibration standards jars and sample jars were equilibrated at 38° F. An ammonium hydroxide solution of about 2.9-7.6 wt % was made by diluting concentrated ammonium hydroxide (ACS reagent, 28.0-30.0% as $NH_3$, Sigma-Aldrich P/N 221228 or equivalent) 2:5-1:10 with deionized water. Jars were inoculated with 10 μL of ammonia solution by removing the jar cap and injecting the ammonia aliquot onto the interior side of the jar. Care was taken to avoid contact of the solution with the non-woven sample and to quickly replace and seal the cap. The jars were then returned to the 38° F. oven and removed for evaluation after 30 minutes. It is crucial that the inoculation process and the timing be carried out identically for all samples. 2, 4, 6, 8 and 10 μL aliquots of the ammonia solution were inoculated into empty jars as standards. Groups of 2-3 jars were inoculated at one time and then returned to the 38° F. chamber for 30 minutes.

40 mL of headspace was extracted by a graduated glass gas-tight syringe (Fisher-Scientific P/N SG-009660 or equivalent) from the jar headspace below the septum of the jars and slowly bubbled into 5 cc of DI water to dissolve the gas phase ammonia. The resulting ammonia solution was titrated to a phenolphthalein endpoint using a graduated 1000 μL syringe with 0.001-0.004 M HCl. The amount of free ammonia present in the jars was then calculated by using a calibration curve from the standards.

TABLE 1

Static Headspace Ammonia Test Summary

| Example | Description | $NH_3$ Challenge (μg) | | | μg $NH_3$ sorbed | | % of Challenged sorbed/g fiber | |
|---|---|---|---|---|---|---|---|---|
| | | | Ave. | Std. Dev. | Ave. | Std. Dev. | | |
| C1 | Control PP | 1044 | 80.4 | 14..2 | 7.7 | 1.4 | | |

TABLE 1-continued

Static Headspace Ammonia Test Summary

| Example | Description | NH$_3$ Challenge (μg) | μg NH$_3$ sorbed Ave. | μg NH$_3$ sorbed Std Dev. | % of Challenged sorbed/g fiber Ave. | % of Challenged sorbed/g fiber Std. Dev. |
|---|---|---|---|---|---|---|
| | Fiber | | | | | |
| Ex 1 | 0.75% Oleic | 1044 | 797.9 | 112.6 | 76.4 | 10.8 |
| Ex 2 | 0.75% Stearic | 1044 | 889.5 | 98.2 | 85.2 | 9.4 |
| Ex 3 | 0.75% ODSA | 1044 | 852.5 | 24.9 | 81.7 | 2.4 |
| Ex 4 | 0.75% Sebacic | 1044 | 896.1 | 48.1 | 85.8 | 4.6 |
| Ex 5 | 0.75% Stearic (no graft) | 1044 | 755.2 | 97.9 | 72.3 | 9.4 |
| Ex 6 | 0.75% ODSA sheath Sebacic core | 1044 | 992.3 | 117.9 | 95.1 | 11.3 |
| Ex 7 | 1.5% CD containing 0.75% ODSA | 1044 | 839.6 | 58.9 | 80.4 | 5.6 |
| C2 | 1.5% CD Low MA | 1044 | 127.0 | 26.1 | 12.2 | 2.5 |
| C3 | 1.5% CD High MA | 1044 | 130.6 | 16.6 | 12.5 | 1.6 |

Formulation C2 is produced with a MAPP that contains approximately 1% Maleic Anhydride. All other formulations employ a MAPP with greater then 2% Maleic Anhydride.

TABLE 2

Comparative Examples MB C2-MB C3 and Examples 8

| Masterbatch | wt % MAPP (wt % maleic anhydride content) | Cyclodextrin (wt %) | PP (wt %) | Polybutene (wt %) | ODSA (wt %) |
|---|---|---|---|---|---|
| MB - C2 | 67 (1.1) | 10 | 23 | N/A* | N/A |
| MB - C3 | 26 (3.0) | 10 | 40 | 14 | N/A |
| MB - 8 | 26 (3.0) | 10 | 45 | 14 | 5 |

*N/A indicates none added

Each of the masterbatch formulas listed in Table 3 was then blended with PP at a ratio of 15/85 (wt/wt) and spunbond fiber was produced with a diameter in the range of 17-20 microns The Headspace Ammonia Analysis described above was followed with the exception that 1 g of spunbond fiber was placed in the 250 mL jars.

Spunbond fibers of Comparative Examples C2 and C3 removed 0.100-0.150 ug of ammonia, an efficiency of about 35%. Spunbond fibers of Example 7 removed 0.840 mg of ammonia, an efficiency of 75%.

All of the fatty acids tested have similar performance on a weight/weight basis. Under test conditions, the difference in the number of acid groups between the di-acids and mono-acids has little effect upon the efficiency of removal of NH$_3$ from the headspace.

Seventeen gram samples of fiber from, Examples C1, 2, 3, and 5 were extracted with 800 ml of a 0.05 Normal NH$_3$ in 5% ethanol solution for 60 minutes to solublize the available organic acids on the surface of the fiber. The weight of the dried extract minus the weight of the control extract was taken to be the Ammonium salt of the fatty acid.(diacids). The results of the fiber extraction can be found in the table below.

TABLE 3

| Sample | Description | Fiber weight | Dried Extract | Percent of acid extracted |
|---|---|---|---|---|
| C1 | Control PP | 34.10 | 0.0044 | NA |
| Ex 2 | Stearic Acid | 33.44 | 0.0162 | 4.7 |
| Ex 3 | ODSA | 33.90 | 0.0152 | 4.25 |
| Ex 5 | Strearic Acid no MAPP | 33.62 | 0.0314 | 10.71 |

With less then 5% of the fatty acids (anhydrides) in the fiber it is expected that the efficiency of the fatty acid addition the fiber would be similar to that of the MAPP fiber and the reduction in Ammonia would be in the order of 500 ug per gram of Fiber. However, surprisingly the amount of ammonia reduction is nearly double the expected value despite the small amount of fatty acid on the surface of the fibers. Despite the fact that a large portion of the fatty acids are not on the surface they are still capable of removing ammonia from the headspace to a much greater efficiency then the MAPP alone. Additionally, performance testing comparison of the treated and control samples of nonwoven fabric product samples was conducted. This testing involved paired comparison evaluation of both samples challenged with an ammonia/urine solution. The samples were evaluated with a trained and an untrained panel of assessors. The testing results from both sensory panels show the ammonia and urine character and overall odor perceived in the treated samples is significantly lower than that perceived in the control samples.

In the detailed testing, the primary sample for testing was called:

Example 7, Spunbond PP Grafted α-CD+ODSA with 0.5% hydrophilic surface treatment For comparison, the control sample provided was called:

Comparative Example C1, Spunbond PP Control with 0.5% hydrophilic surface treatment.

The testing objective was to document that when exposed to an ammonia/urine solution, the treated sample of non-woven fabric reduces the odor intensity more than the control sample. A small volume of an ammonia/urine solution was placed in the bottom of glass jars lined with the fabric samples. The samples were heated and evaluated to determine which of the two samples had lower odor intensity. The assessors also reported odor descriptor terms noticed in the samples.

ASTM International E2164-01, *Standard Test Method for Directional Difference Test*, was used to evaluate if the treated sample had the lower odor intensity. The general nature of this standard is to present two samples to an assessor and have them determine a difference between the samples based on one attribute/parameter (paired comparison). The number of assessors needed for the test is dependent on the chosen statistical power.

For this test, it was determined that a Type I error of 5% ($\alpha$=0.05) was acceptable, which refers to 5% risk that a difference exists when one does not. Additionally, a Type II error of 30% ($\beta$=0.30) was acceptable, which refers to a 30% risk that there is no difference when there actually is one. A high level of Type II risk is acceptable, since this favors the control sample. Finally, a PMAX value of 75% was used, the proportion of common responses that we want to test against. In other words, the results of the test will provide evidence that more than 75% of the population will detect a difference in the samples above the level of chance alone.

ASTM E2164 provides look-up tables to determine the number of assessors needed for these statistical parameters. A one-tailed test was used since the treated sample was expected to be lower in odor intensity; therefore, it was determined from the standard that a minimum of 18 assessor responses are necessary.

The ammonia solution used for this testing was prepared by placing 1.6-mL of a 29% ammonium hydroxide solution into 100-mL of deionized water. The solution was well mixed. This ammonia solution was then used to reconstitute freeze-dried urine (KOVA-Trol II Low Abnormal Human Urinalysis Control; HYCOR Biomedical, Inc.). This freeze-dried urine was reconstituted with 30-mL of the ammonia solution. The urine is normally reconstituted with 60-mL of water, so the ammonia solution was used to increase the ammonia odor of the urine and only 30-mL was used to provide a more concentrated urine.

Samples were prepared with 4.5"×6" swatches of the fabric samples lining the wall of 250 mL glass jars (4.5" tall, 6" circumference) with Teflon lined lids. The samples were coded with three digit randomly generated numbers labeled on the jar lids. The covered jars were preheated in a 38° C. oven for 30 minutes. Next, an auto-pipette was used to place 10 μL of the ammonia/urine solution in the bottom of the jar. Care was taken not to contact the fabric directly with the solution. The jar was capped and placed back in the oven at 38° C. and presented to the assessors for observation after 30 minutes. The entire 10 μL of solution evaporated to provide an ammonia concentration of approximately 250-ppm.

An initial test was done of the fabric samples utilizing thirteen assessors trained and experienced in sensory evaluation of products and materials. The assessors have previously been trained to various sensory testing methodologies including threshold testing, scaling, discrimination techniques, and the application of various attribute ratings. Each assessor was presented two pairs of the treated and control samples. The pairs of samples was presented with random order presentation for a balanced design so each sample type appeared first and second in sequence an equal number of times.

The presentations were conducted independently with different sample coding for each pair. The assessors received the first pair immediately after they were removed from the oven. The assessors removed the lid of the first jar sample and immediately sniffed the sample with their nose near the jar opening. The assessors were instructed to take as much time as they felt necessary to rest their nose before sniffing the second sample. This was usually a rest period of about 30-60 seconds. The assessor repeated the observation with the second jar. The test questionnaire asked the assessor to report which of the samples had "the lower odor intensity."

After completing this first observation, the jars were removed from the testing room and the lids were replaced with lids labeled with different codes. The jars were held for two-minutes and returned to the assessors. The assessors repeated the evaluation to determine which sample was lower in odor intensity and they were asked to complete character profiling questionnaires for each sample. They had been provided instruction for this ahead of time, so they were aware they needed to be observant of specific descriptors when evaluating the second set of samples. For each sample, the assessors reported the hedonic tone, the odor character descriptors observed, and the relative strength of main odor character and sensation (feeling) categories.

Hedonic tone is a measure of the pleasantness or unpleasantness of an odor. This is a subjective test parameter where assessors use a scale of −10 (most unpleasant) to +10 (most pleasant) to report their perception of the odor. A score of zero is a neutral odor. The hedonic tone values provided by the trained assessors should not be considered to represent the opinions of the general population. The values should be used for comparison of the pleasantness between samples since they were observed by the same panel of assessors.

Assessors report the odor descriptors they notice by marking characters on a standard computerized scoring sheet. The odor characters are organized into eight main categories: vegetable, fruity, floral, medicinal, chemical, fishy, offensive, and earthy. When a descriptor term is assigned to an odor, the main odor descriptor categories can be rated in relative strength on a 1 to 5, faint to strong, scale (0=not present). The odor testing descriptor data is then plotted on a spider plot (radar plot) format with the distance along each axis representing the 0-5 scale for each of the categories. The plot creates a "pattern" that can be readily compared to spider plots for other samples. Furthermore, specific odor descriptors are presented in a histogram where each reported descriptor is listed along with the percent of reporting assessors.

The Trigeminal Nerve (Fifth Cranial Nerve), located throughout the nasal cavity and the upper palate, and other nerves sense the presence of some odors (i.e. "feels like . . . " rather than "smells like . . . "). Eight (8) common sensation descriptors that can be used include: itching, tingling, warm, burning, pungent, sharp, cool, and metallic. Again, assessors can rate the strength of the presence of these attributes on a 0 to 5 scale and the results then plotted on a spider plot.

After completing the character profiling, a second set of samples was removed from the oven and presented to the assessors to determine which had lower odor intensity.

A second test was conducted with a consumer panel of untrained assessors. Twenty assessors were selected from the general population. The assessors were over 18 years of age and nonsmokers.

Each assessor was presented the two pairs of samples two times with the order of presentation randomized so each sample was presented first and second in sequence an equal number of times. Each pair was independently coded, so the assessors did not know they were the same pair of samples. For each pair, the questionnaire asked the assessor to report which sample had "the lower odor intensity." After observing the set of samples a second time, the assessors were asked to report the presence of ten odor descriptor terms in each sample by checking a box if they were present. The ten descriptor terms were: floral, vegetable, earthy, musty, sulfurous, fishy, chemical-like, urine, ammonia, and medicinal. The assessors were also allowed to report "other" and write in their own terms.

Results

Trained Panel

For the thirteen trained assessors, in the first round of the pair comparison testing, 13 of the 13 assessors selected the treated sample (Example 7) as having the lower odor intensity. In the second round of observing the same samples, 11 of the 13 selected this treated sample as having the lower intensity.

In the second set of pairs, 12 of the 13 assessors selected the treated sample (Example 7) as having lower odor intensity.

Overall, for the first round of evaluating the samples, this is 25 of the 26 observations identifying the treated sample as lower intensity. Of all samples, this is 36 of the 39 observations identifying the treated samples as lower intensity. Table 3 in ASTM E2164 provides the necessary number of responses for a statistically significant result for a one tailed test based on the Type I error and the number of assessors used. This table shows that if 10 or more of 13 assessors identify the treated sample as lower odor intensity, then this would be a statistically significant result. Therefore, the eleven to thirteen selections for all tests provides evidence at the 95% level that the population would be able to detect the treated sample as providing a lower odor intensity. Taking into account the results of the three sets of observations, the 25 of 26 identifications and the 36 of 39 identifications are greater than 99.9% confidence that the treated sample would be identified as having lower odor intensity.

The average hedonic tone values provided by the trained assessors were −1.6 for the treated sample (Example 7) and −4.9 for the control sample (Comparative Example C1). The treated sample would be considered to be more neutral (closer to zero), though it is towards the unpleasant side of the scale. The hedonic tone value of the control sample suggests it was very unpleasant. The values were found to be statistically different ($p<0.0001$, $\alpha=0.05$).

The odor descriptor terms provided by the assessors included earthy, stale, offensive, and musty for the treated sample and ammonia, urine, offensive, and musky for the control sample. Earthy characters had the highest frequency of reporting for the treated sample. Medicinal, including ammonia, and offensive, including urine, had the highest frequency of reporting for the control sample.

Figure 1:
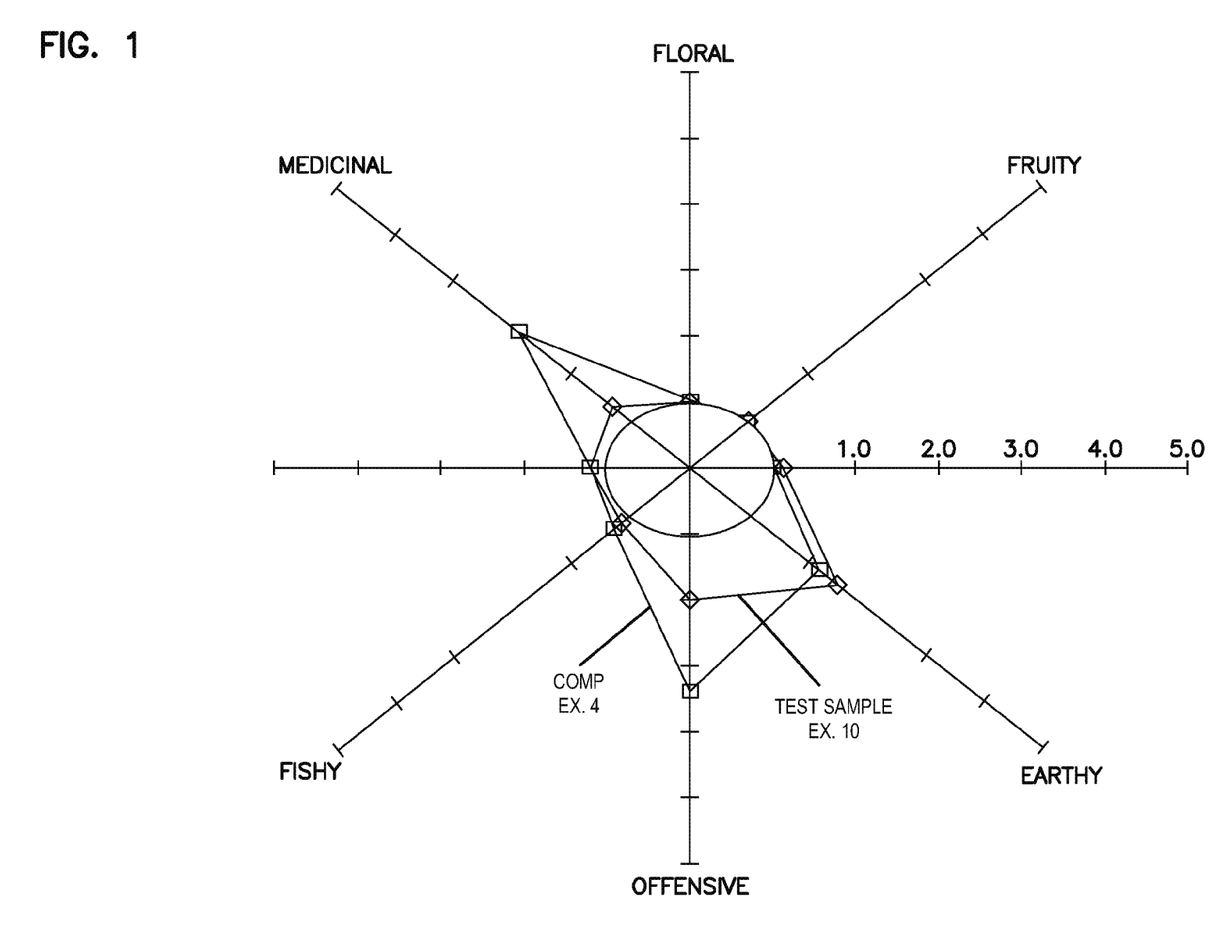
FIGS. 1 and 2 are graphical representations of performance testing comparison of the treated and control samples of nonwoven fabric product samples. This testing involved paired comparison evaluation of both samples challenged with an ammonia/urine solution.
Figure 2:
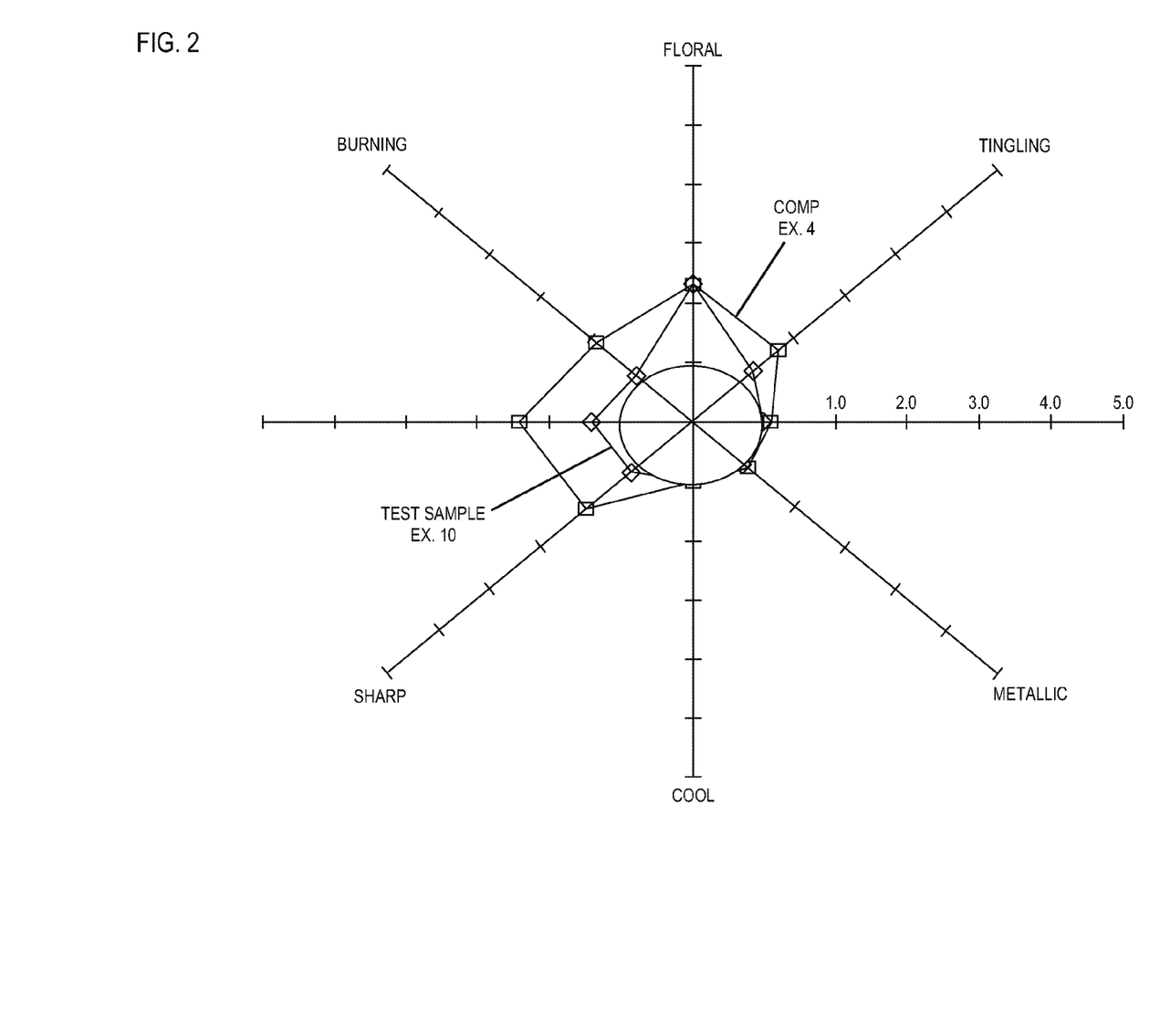
Figure 3A:
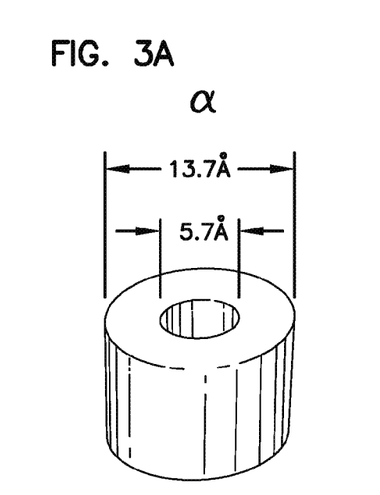
FIGS. 3A, 3B and 3C illustrate the dimensions of a cyclodextrin molecule without derivatization. The central pore comprises the hydrophilic space, central pore or volume within the cyclodextrin molecule that can act as a site for absorbing a permeant or such contaminant.
Figure 3B:
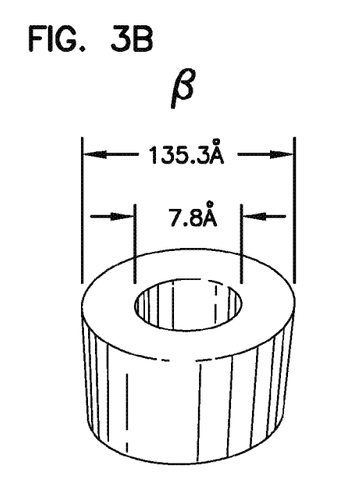
Figure 3C:
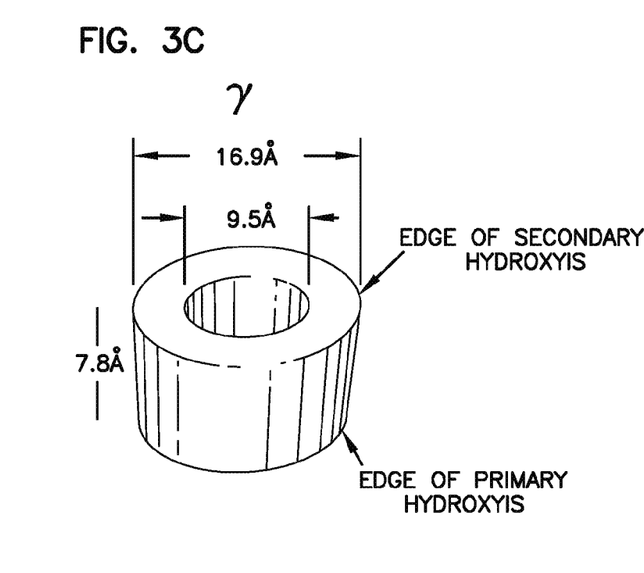

FIG. 1 provides a summary of the relative strength ratings of the odor character categories. The control sample had the highest relative strength and greatest difference compared to the treated samples for medicinal and offensive characters. The treated sample was slightly higher than the control in earthy FIG. 2 provides a summary of the relative strength of odor sensations (feelings). The control samples had the highest relative strength and greatest difference from the treated samples for burning, pungent, and sharp categories. The only sensations reported for the treated sample was light pungent and warm, which was at the identical relative strength level of the control sample and is likely due to the fact the samples were presented to the assessors within minutes of being removed from the 38° C. oven. For the untrained assessors, in the first round of the pair comparison testing, 17 of the 20 assessors selected the treated sample as having the lower odor intensity. In the second presentation of the first pair of samples, 16 of the 20 assessors selected the treated samples as having lower odor intensity. In the second set of samples, 19 of the 20 assessors selected the treated sample as lower odor intensity in the first observation. In the second presentation of the second pair, 15 of the 20 assessors selected the treated sample as lower odor intensity.

Overall, in the first observations of the two sets of samples, this is 36 of 40 observations identifying the treated samples lower in odor intensity. In observing the samples the second time, 31 of the 40 observations identified the treated samples as lower in odor intensity.

Reviewing the results of each round, we can be at least 95% confident that the population would be able to detect the treated sample as providing lower odor intensity. The 36 of 40 and 31 of 40 responses in both rounds combined provides 99.9% confidence level that the population will detect the treated sample as having a lower odor intensity. The consumer panel also recorded the odor descriptors they noticed in the second observation of each set of samples. In the first set of samples, 30% of assessors reported ammonia and urine character in the control sample and only 15% reported these characters present in the treated sample. Earthy and musty were noticed most frequently in both samples. In the second set of samples, 40% reported ammonia and 20% reported urine in the control sample and 5% reported these characters in the treated sample. Again, earthy and musty were noticed most frequently.

The directional difference (paired comparison) testing of Treated Sample Example 7 compared to Control Sample Comparative Example C1 documented that the treated fabric reduced ammonia and urine odors more than the control fabric.

The results of the panel of trained sensory assessors show that at greater than the 99% confidence level the population would notice the treated fabric reduces the odor more than the control. The trained assessors found the hedonic tone of the control sample to be significantly more unpleasant than the treated sample. These trained assessors also reported the control sample had a higher level of medicinal and offensive odors and a higher level of sharp and pungent sensations.

The results from the consumer sensory panel (untrained assessors) also shows that at greater than 99% confidence level the general population would notice the treated fabric reduces the odors more than the control. These assessors also noticed the control sample odors contained more ammonia and urine odors than the treated sample, while both had earthy and musty odors.

Various modifications and alterations of the embodiments and examples in accordance to the invention will become apparent to those skilled in the art without departing from the scope and spirit of the disclosure, and it should be understood that this disclosure is not to be unduly limited to the illustrative embodiments and examples set forth herein.

We claim:

1. A thermoplastic polymer composition, comprising
   (i) a blend of:
     (1) a 48 to 94 wt % of a polyolefin resin and
     (2) about 1 wt % to 50 wt % of a modified polyolefin resin, and
   (ii) from about 0.1 wt % to about 5 wt % of a non-volatile and polymer compatible carboxylic acid based on the polymer composition wherein the carboxylic acid is a $C_8$ to $C_{200}$ dicarboxylic acid.

2. The thermoplastic polymer composition of claim 1 wherein the non-volatile and polymer compatible carboxylic acid comprises between about 0.25 wt % to about 2.5 wt % based on the thermoplastic polymer composition.

3. The thermoplastic polymer composition of claim 2 wherein the dicarboxylic acid is an acid anhydride.

4. The thermoplastic polymer composition of claim 2 wherein the dicarboxylic acid is a $C_8$ to $C_{28}$ alkenyl substituted succinic acid or anhydride and the thermoplastic polymer composition comprises between about 0.5 wt % to about 1.5 wt % based on the polymer composition.

5. The thermoplastic polymer composition of claim 4 wherein the dicarboxylic acid is an octadecenyl substituted succinic acid or anhydride and the thermoplastic polymer composition comprises between about 0.5 wt % to about 1.5 wt % based on the polymer composition.

6. The thermoplastic polymer composition of claim 1 comprising about 0.01 to about 15 wt % of the modified polyolefin resin; wherein the polyolefin resin comprises a melt index of about 0.5 to 1500 g-10 $min^{-1}$ and the modified polyolefin resin is derived from a polyolefin having a melt index of about 0.7 to 800 g-10 $min^{-1}$.

7. The thermoplastic polymer composition of claim 1 wherein the polyolefin resin comprises a polyethylene and the modified polyolefin resin comprises a cyclodextrin-modified polyethylene.

8. The thermoplastic polymer composition of claim 1 wherein the polyolefin resin comprises a polypropylene and the modified polyolefin resin comprises a cyclodextrin-modified polypropylene.

9. The thermoplastic polymer composition of claim 1 wherein the polyolefin resin comprises a poly(ethylene-co-propylene) and the modified polyolefin resin comprises a cyclodextrin-modified poly(ethylene-co-propylene).

10. The thermoplastic polymer composition of claim 1 wherein the modified polyolefin resin comprises a cyclodextrin bonded to a maleic anhydride modified polyolefin wherein the modified polyolefin resin comprises about 0.05 to about 5 weight percent maleic anhydride moieties.

11. The thermoplastic polymer composition of claim 1 wherein the modified polyolefin resin comprises a cyclodextrin-modified high-density polyethylene.

\* \* \* \* \*